F. W. LEONARD.
REVOLVING CULTIVATOR.
APPLICATION FILED MAY 25, 1911.
1,018,717.
Patented Feb. 27, 1912.
2 SHEETS—SHEET 2.
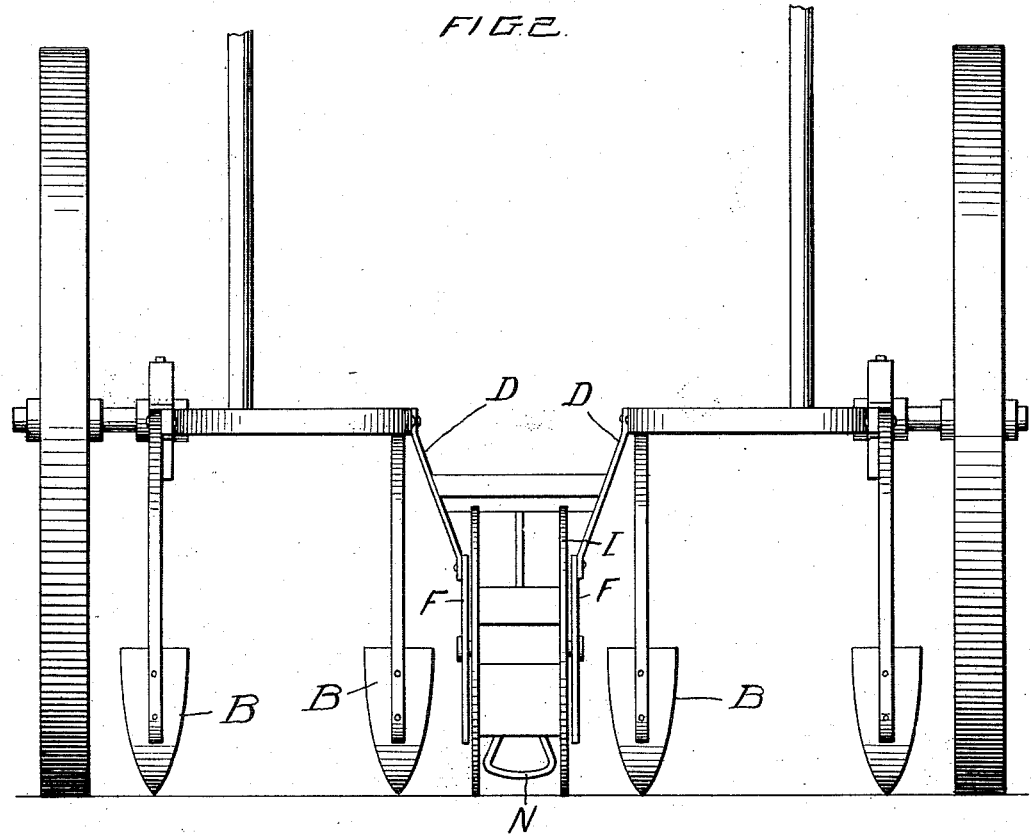
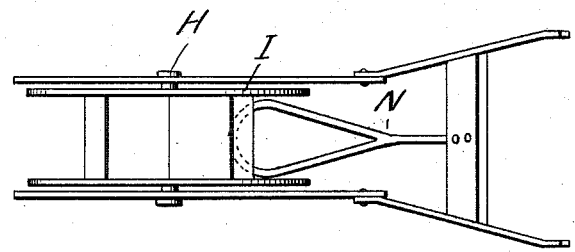

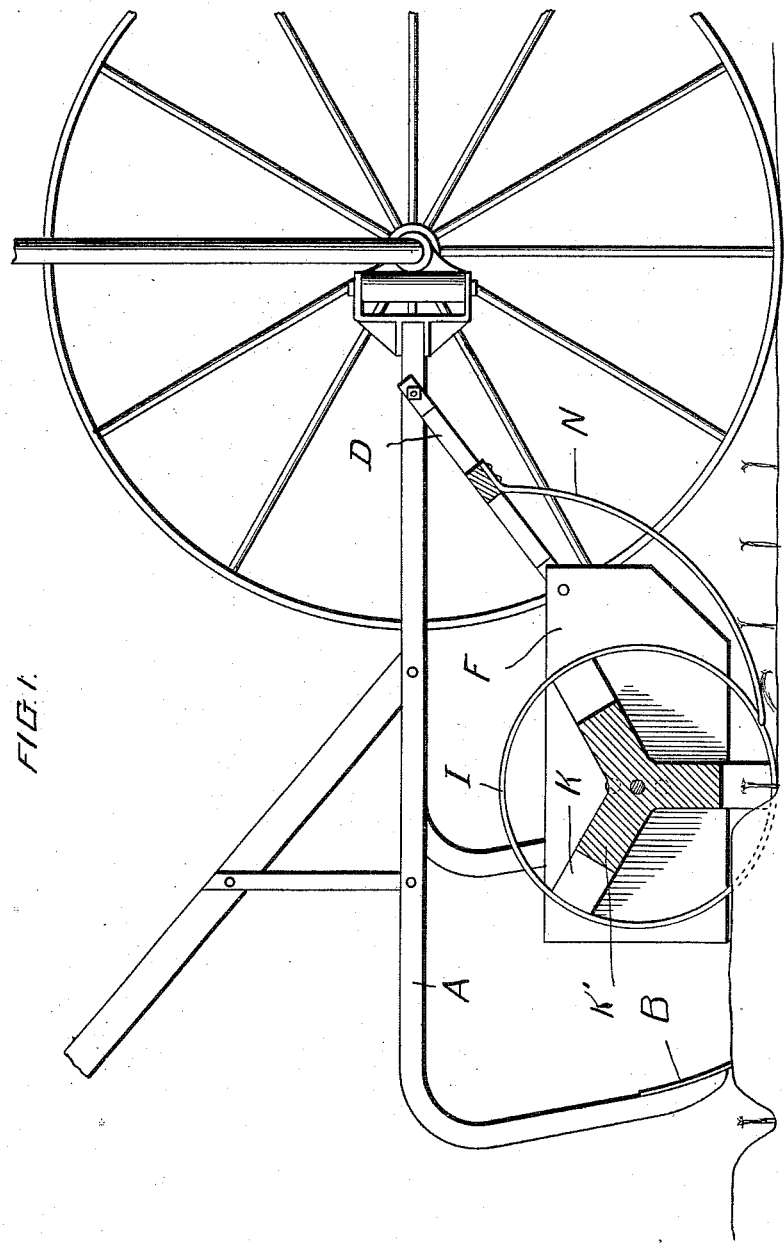

UNITED STATES PATENT OFFICE.

FRANK W. LEONARD, OF MOUNTAIN VIEW, OKLAHOMA.

REVOLVING CULTIVATOR.

1,018,717.  Specification of Letters Patent.  Patented Feb. 27, 1912.

Application filed May 25, 1911. Serial No. 629,459.

*To all whom it may concern:*

Be it known that I, FRANK W. LEONARD, a citizen of the United States, residing at Mountain View, in the county of Kiowa and State of Oklahoma, have invented certain new and useful Improvements in Revolving Cultivators; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in cultivator fenders and weed depressors and comprises various details of construction and combinations and arrangements of parts which will be hereinafter fully described and then specifically defined in the appended claims.

I illustrate my invention in the accompanying drawings, in which:—

Figure 1 is a vertical sectional view through a cultivator, parts being shown in elevation. Fig. 2 is a rear view, and Fig. 3 is a top plan view.

Reference now being had to the details of the drawings by letter, A designates the beam of the cultivator having the cultivator plows B of the usual construction, and to the frame of the cultivator my improved apparatus is adapted to be held by means of the bars D and in the manner shown clearly in Fig. 2 of the drawings. Said bars D have fastened thereto in parallel relation the fender plates F which are positioned with their lower edges a slight distance above the surface of the ground. Mounted in suitable bearings in said fender plates is a shaft H having the skeleton wheel rims I fastened thereto which have radially disposed guards K connecting the solid hub portion K′ with the rim. Said guards K are arranged in pairs and spaced apart and are adapted to hold loose dirt from covering up certain of the plants as the cultivator is moved over the row of cotton or other plant being listed.

A weed turner, designated by letter N, is fastened to the bar D and is adapted to press against and drag over the surface of the ground for the purpose of turning down weeds and plants which are covered up by the loose dirt which is thrown up by the cultivator plows, excepting such plants as may come opposite the guards which cause the dirt to be prevented from covering the same.

The operation of the invention is as follows:—As the cultivator passes over the ground, the weed turner will press down against the surface of the ground all plants and weeds within which it comes in contact. The soft dirt which is thrown up by the plows covers up the various weeds and all of the plants excepting those which come between the pairs of guards and which latter will tend to prevent the loose dirt from covering the plants at intervals. Said plants which have been depressed by the weed turner will straighten up if not covered by the loose dirt, thus leaving a row of plants in the manner shown and described.

What I claim to be new is:—

1. A cultivator and weed turner, comprising a frame with cultivator plows, bars fastened to said frame, fenders fixed to said bars, a rotatable member having spindle ends journaled in apertures in said fenders, said member provided with arms, guards projecting from said arms, and a wheel rim fixed to the guards, as set forth.

2. A cultivator and weed turner comprising a frame with cultivator plows, fenders supported by the frame and spaced apart, a rotatable member mounted between the fenders and having radial arms, guards projecting from the latter and arranged in pairs and adapted to prevent dirt from covering certain plants being cultivated, a wheel rim fastened to the outer ends of the guards, a rod bent to form a loop and fastened to the frame, said bar being bent to form a loop and bowed and positioned in advance of the rotary member.

In testimony whereof I hereunto affix my signature in the presence of two witnesses.

FRANK W. LEONARD.

Witnesses:
 H. SCHAEFER,
 W. H. BERRY.

Copies of this patent may be obtained for five cents each, by addressing the "Commissioner of Patents, Washington, D. C."